US007006516B2

(12) United States Patent
Bellier et al.

(10) Patent No.: US 7,006,516 B2
(45) Date of Patent: Feb. 28, 2006

(54) METHOD AND ARRANGEMENT FOR ALLOCATING TIME SLOTS FOR AN ASSOCIATED CONTROL CHANNEL

(75) Inventors: Thierry Bellier, Helsinki (FI); Harri Jokinen, Hiisi (FI)

(73) Assignee: Nokia Mobile Phones, Ltd., Espoo (FI)

( * ) Notice: Subject to any disclaimer, the term of this patent is extended or adjusted under 35 U.S.C. 154(b) by 917 days.

(21) Appl. No.: 09/825,430

(22) Filed: Apr. 3, 2001

(65) Prior Publication Data

US 2001/0026560 A1   Oct. 4, 2001

(30) Foreign Application Priority Data

Apr. 4, 2000   (FI) .................................. 20000792

(51) Int. Cl.
*H04J 3/16*   (2006.01)
*H04Q 7/00*   (2006.01)

(52) U.S. Cl. ...................... 370/437; 370/329; 370/468; 455/450

(58) Field of Classification Search ................ 455/453, 455/452, 63, 67.1, 67.3, 70, 450, 513, 515; 370/332, 329, 432, 442, 468, 437
See application file for complete search history.

(56) References Cited

U.S. PATENT DOCUMENTS

| | | | | |
|---|---|---|---|---|
| 4,905,234 A | | 2/1990 | Childress et al. | 370/94.1 |
| 5,182,753 A | * | 1/1993 | Dahlin et al. | 714/749 |
| 5,881,105 A | | 3/1999 | Balachandran et al. | 375/259 |
| 6,084,865 A | * | 7/2000 | Dent | 370/321 |
| 6,292,664 B1 | * | 9/2001 | Ostrup et al. | 455/453 |
| 6,466,568 B1 | * | 10/2002 | Raith et al. | 370/347 |
| 6,813,252 B1 | * | 11/2004 | Chang et al. | 370/294 |

FOREIGN PATENT DOCUMENTS

| | | |
|---|---|---|
| WO | WO 98/09391 | 3/1998 |
| WO | WO 00/35137 | 6/2000 |
| WO | WO 00/41323 | 7/2000 |
| WO | WO 00/52831 | 9/2000 |

OTHER PUBLICATIONS

"3 GPP TSG GERAN Adhoc#2. Associated Control Channels for Quater Rate Channels", 2000, 8 page document.

* cited by examiner

*Primary Examiner*—Hahn Nguyen
(74) *Attorney, Agent, or Firm*—Perman & Green, LLP

(57) ABSTRACT

A method and the corresponding devices are disclosed for transmitting control information on a control channel associated with a traffic channel. The traffic channel is determined to be either a full- or half rate channel or a quarter rate channel. As a response to determining the traffic channel to be a full- or half rate channel, a control information block of fixed size is transformed into a first number of control information bursts which are all transmitted. As a response to determining the traffic channel to be a quarter rate channel, a control information block of said fixed size is transformed into a second number of control information bursts, where said second number is smaller than the first number. Said second number of control information bursts are transmitted. It is checked, whether a retransmission is requested concerning said second number of transmitted control information bursts. If a retransmission is requested concerning said second transmitted control information bursts, another number of control information bursts is transmitted describing the contents of the control information block which was transformed into said second number of transmitted control information bursts.

6 Claims, 7 Drawing Sheets

US 7,006,516 B2

METHOD AND ARRANGEMENT FOR ALLOCATING TIME SLOTS FOR AN ASSOCIATED CONTROL CHANNEL

TECHNOLOGICAL FIELD

The invention concerns generally the allocation of time slots to control channels in a telecommunication system where time division multiple access is used. Especially the invention concerns the allocation of time slots to a low-rate control channel associated with a certain data channel the data rate of which is one quarter of a nominal full data rate.

BACKGROUND OF THE INVENTION

From the technology of the GSM (Global System for Mobile telecommunications) there is known the concept of a slow associated control channel or SACCH. The SACCH is a logically separate channel that physically shares a capacity allocation with a dedicated traffic channel. In the following we describe briefly some known features of the SACCH and its relation to the corresponding traffic channel.

In GSM, capacity at the radio interface is allocated in burst periods or BPs, which are sometimes also referred to as slots. Eight consecutive burst periods constitute a frame, the length of which in time is 60/13 ms or approximately 4.615 ms. A full-rate traffic channel corresponds to a capacity allocation where exactly one burst period is allocated from each frame. The ordinal number of the allocated burst period stays the same from frame to frame and is even the same in the uplink and downlink frames that constitute the parts of a bidirectional full-rate traffic channel. A fixed shift of three burst periods exists between the uplink and downlink frames so that the uplink burst period allocated to a certain bidirectional full-rate traffic channel always occurs three burst periods after the correspondingly numbered downlink burst period.

The full rate should not be confused with the maximum achievable data rate, because in the later development work concerning GSM also so-called multislot channels have been specified where more than one burst period per frame are allocated to a single communication connection. Instead, a traffic channel with one slot per frame allocated thereto could be regarded to have a "nominal" full rate.

A period of exactly 120 ms comprises 26 frames and is denoted as the multiframe. Of the 26 allocated burst periods in a multiframe, 24 are used for the traffic channel, one is used to transmit an SACCH burst and one is a so-called idle burst period where nothing is transmitted.

In order to understand the relation between an SACCH burst and certain SACCH bits to br transmitted one must be familiar with some channel encoding. A sequence of 184 uncoded SACCH bits is known as an SACCH block. In the channel encoding process it is first subjected to encoding by a Fire code, which adds 40 bits. The result is convolutionally encoded with a rate ½ convolutional encoder which gives at its output an encoded SACCH block consisting of 456 bits. These are distributed into four chunks of 114 bits each, so that eventually four complete SACCH bursts are needed in order to get the information contents of a single SACCH block transmitted. A simple multiplication shows that since one SACCH burst is transmitted within each multiframe of 120 ms, the time required to get the information contents of a single SACCH block transmitted is four multiframes or 480 ms.

Already the original form of the GSM specifications defined also other types of traffic channels than the full-rate one referred to above. More specifically half-rate and eighth-rate traffic channels have been defined. The burst period allocations for these follow a simple alternation scheme where e.g. two half-rate traffic channels take the place of a single full-rate one. Of the 24 traffic burst periods within a multiframe each half-rate channel gets 12. One SACCH burst period is still left for each half-rate channel so that during the SACCH burst period of the first half-rate channel the second is idle and vice versa.

The advent of EDGE (Enhanced Data Rates for GSM Evolution) has promoted the specification of a quarter-rate traffic channel which may be denoted as a TCH/4 for short. FIG. 1 illustrates a proposed allocation of traffic (T) and SACCH (S) burst periods for the four TCH/4s which in the allocation scheme take the place of a single full-rate traffic channel. The graphical representation selected for FIG. 1 is the known one where time advances "helically", i.e. the stream of consecutive burst periods is wound into a helix where one round has the length of one frame (8 burst periods). This representation has the advantage of showing the cyclically repeated burst periods allocatable to one full-rate traffic channel in a straight row. We designate the four TCH/4s as the subchannels 0, 1, 2 and 3. In order to have exactly one fourth of the traffic capacity of a full-rate traffic channel left for each subchannel we must assume that of the 26 allocated burst periods of a multiframe, six must be allocated for each subchannel. However, this assumption leaves only two burst periods per superframe free for SACCH bursts. In order to accommodate one SACCH burst per subchannel we must now consider the combined length of two multiframes, which is 240 ms in time and consists of 52 consecutive frames. FIG. 1 shows a proposed allocation scheme for the burst periods where each subchannel gets approximately every fourth allocatable burst period ("approximately", because at frames 12–13 and 24–25 there is a shift of one frame to accommodate the SACCH bursts) and the SACCH bursts of subchannels 0, 1, 2 and 3 go into the 12th, 25th, 38th and 51st allocatable burst period of the "double multiframe" respectively.

The proposed allocation scheme of FIG. 1 has the drawback of doubling the transmission delay of an SACCH compared to that available for the SACCHs associated with full- and half-rate traffic channels. Previously we noted that the SACCHs associated with full- and half-rate traffic channels get one burst period per a multiframe of 120 ms; since four bursts are required to transmit the information contents of a single SACCH block, the total transmission delay for an SACCH block is four multiframes or 480 ms. In the scheme of FIG. 1 every SACCH gets one burst period per a double multiframe of 240 ms; since four SACCH bursts are still required to transmit the information contents of a single SACCH block, the total transmission delay is four double multiframes or 960 ms.

One might consider rearranging the SACCH allocations so that of the 16 SACCH burst periods within a sequence of eight consecutive multiframes, one subchannel would get e.g. the 1st, 3rd, 5th and 7th burst period, another subchannel would get the 2nd, 4th, 6th and 8th burst period, still another subchannel would get the 9th, 11th, 13th and 15th burst period and the remaining subchannel would get the 10th, 12th, 14th and 16th burst period. This way the group of four SACCH bursts required to transmit a single SACCH block would in every subchannel be transmitted within the period of four consecutive multiframes. However, after such a transmission there would be complete SACCH silence on that subchannel for another four consecutive multiframes, which is not advantageous. Another straightforward solution would be to allocate more than two burst periods per multiframe for SACCH, but this approach has the serious drawback of reducing the number of burst periods available for actual traffic and requiring fundamental changes to overall allocation schemes.

SUMMARY OF THE INVENTION

It is an object of the invention to present a method and an arrangement for allocating transmission capacity for a control channel associated with a quarter rate channel with only modest increase in transmission delay in comparison with the control channels associated full and half rate channels.

The objects of the invention are achieved by reducing the amount of channel coding used to code a block of data on the control channel, and grouping the control channel transmissions so that first an attempt is made to transmit a lightly coded version of the block of data. Only if required a retransmission is made resulting in a heavier net coding rate.

In its first embodiment the invention applies to a method for transmitting control information on a control channel associated with a traffic channel, comprising the steps of
a) determining the traffic channel to be either a full- or half rate channel or a quarter rate channel and
b1) as a response to determining the traffic channel to be a full- or half rate channel at step a), transforming a control information block of fixed size into a first number of control information bursts and transmitting all these control information bursts; it is characterized in that it comprises the steps of
b2) as a response to determining the traffic channel to be a quarter rate channel at step a),
transforming a control information block of said fixed size into a second number of control information bursts, where said second number is smaller than the first number,
transmitting said second number of control information bursts,
checking, whether a retransmission is requested concerning said second number of transmitted control information bursts, and
if a retransmission is requested concerning said second transmitted control information bursts, transmitting another number of control information bursts describing the contents of the control information block which was transformed into said second number of transmitted control information bursts.

In its second embodiment the invention applies to a method for receiving control information on a control channel associated with a traffic channel, comprising the steps of
a) determining the traffic channel to be either a full- or half rate channel or a quarter rate channel and
b1) as a response to determining the traffic channel to be a full- or half rate channel at step a), buffering a first number of received control information bursts and transforming them into a control information block of fixed size;
it is characterized in that it comprises the steps of
b2) as a response to determining the traffic channel to be a quarter rate channel at step a),
buffering a second number of received control information bursts, where said second number is smaller than the first number,
attempting the transformation of said second number of control information bursts into a control information block of fixed size,
checking, whether the attempted transformation of said second number of control information bursts into a control information block of fixed size was successful, and
if the attempted transformation of said second number of control information bursts into a control information block of fixed size was not successful, requesting for a retransmission concerning said second number of transmitted control information bursts and attempting the transformation of said second number of control information bursts together with a retransmission concerning them into a control information block of fixed size.

The invention takes advantage of the insight that the whole use of a quarter-rate traffic channel is quite closely related to an assumption of reasonably good propagation conditions for a radio signal. Since the original channel coding scheme for control channel data was devised to make the transmission of control data robust enough for arbitrary propagation conditions, lighter channel coding may well be enough to protect the control data associated with a quarter rate channel.

If the information contents of a control data block can be squeezed into only two control data bursts instead of four, it is possible to allocate enough transmission capacity from four consecutive multiframes for transmitting even a complete control data block on each of the four quarter-rate subchannels that take the place of a single full-rate channel.

If the assumption of the reasonably good propagation conditions was overoptimistic, interference and/or noise corrupts the control data bursts so badly that the receiving device can not decode the control data block from the two control data bursts it received. In such a case it may ask for a retransmission within the next period of four consecutive multiframes. The retransmission is most advantageously composed so that combining it with the originally transmitted, lightly coded form of the control data block gives the receiving device enough information to correctly decode the control data block. Even then the net transmission delay is only eight multiframes, which is not more than the best obtainable delay in the above-described prior art solutions.

For the retransmission to be possible the transmitting device needs to know about it being required. According to the invention the uplink and downlink allocations for the control channels are so correlated that after a first, lightly coded attempt of transmitting the control information there occurs a turn for responding well in advance of the time when the retransmission should be transmitted if needed.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
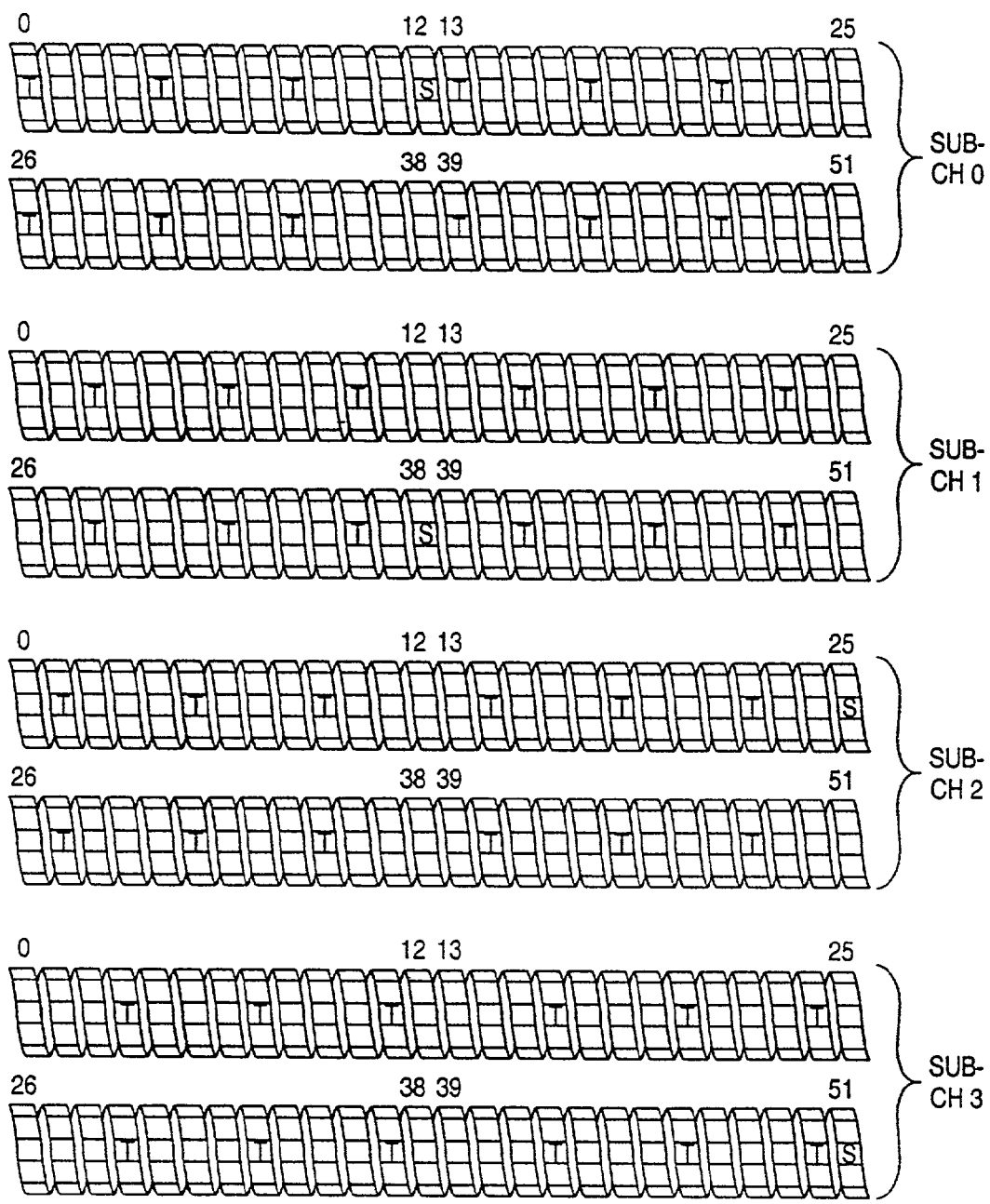
FIG. 1 illustrates a known proposal for SACCH allocation.
Figure 2A:
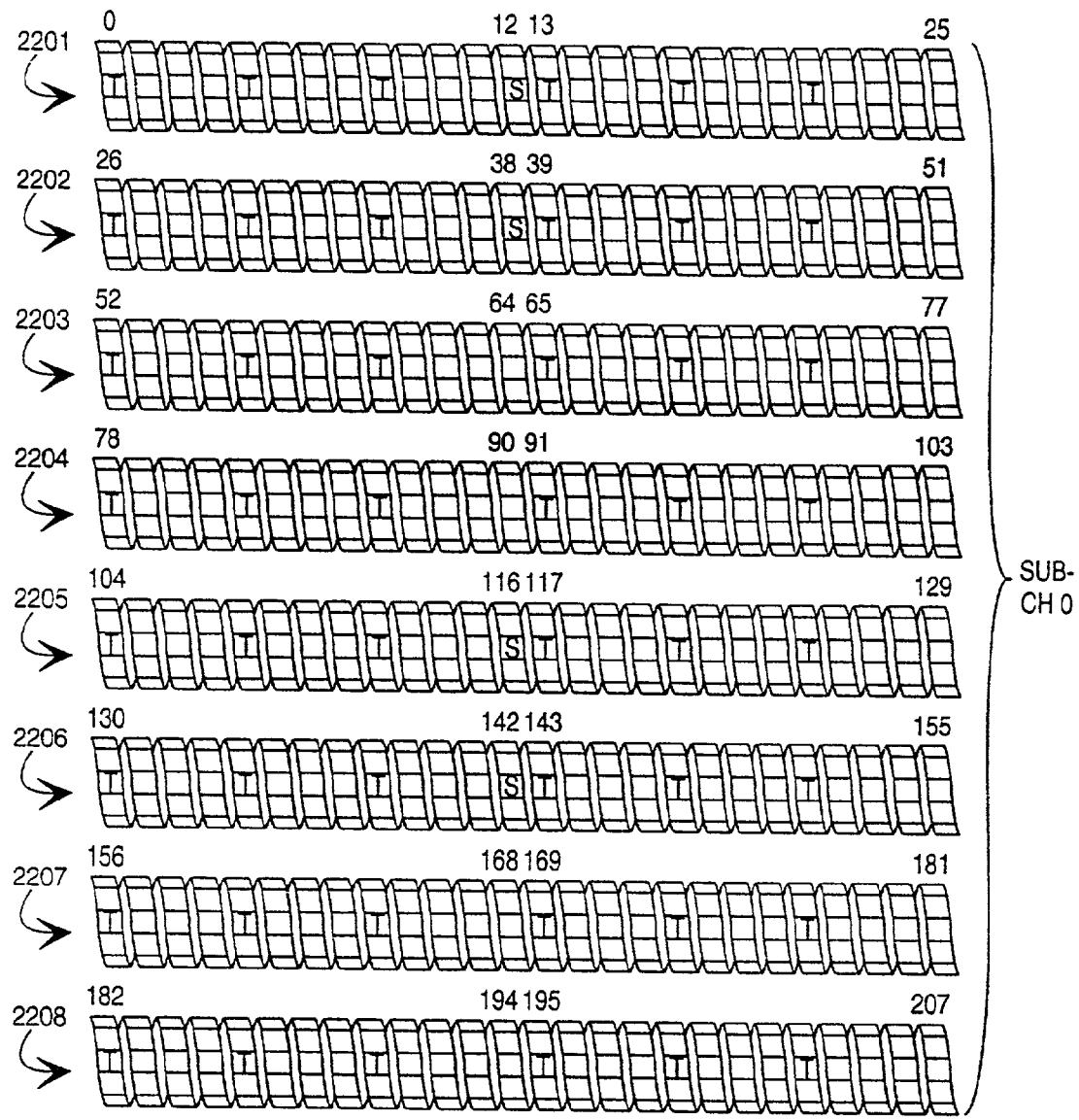
FIG. 2a illustrates a part of SACCH allocation according to an embodiment of the invention.

FIG. 2a illustrates a sequence of eight consecutive multiframes of 26 frames each, which altogether makes 208 frames numbered from 0 to 207. The channels the burst period allocation of which is shown in FIG. 2a are a quarter-rate traffic channel and its associated slow control channel. Together these constitute what is designated here as the first subchannel or subchannel 0. According to the known definition of a quarter-rate traffic channel, approximately every fourth of those burst periods which a full-rate traffic channel would get are allocated for it. Here again "approximately" means that of the allocatable 26 burst periods of each multiframe, the quarter-rate traffic channel gets six.

According to an embodiment of the invention the burst periods allocated for a single control channel, designated as the SACCH burst periods for short, are located so that two SACCH burst periods are always relatively close to each other in consecutive multiframes. For example there is one allocated SACCH burst period S in the first two multiframes 2201 and 2202. A period of two other multiframes 2203 and 2204 separates said consecutive multiframes from the next occurrence of multiframes 2205 and 2206 were SACCH allocations exist. Thereafter there comes another two multiframes 2207 and 2208 with no SACCH allocations to the channel concerned.

Figure 2B:
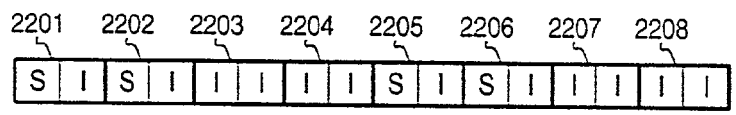
FIG. 2b illustrates an alternative way of graphically presenting the allocation of FIG. 2a, FIG. 3a is a graphical comparison between SACCH allocations in full-, half- and quarter-rate channels.

The allocation of burst periods for traffic channels stays the same in all multiframes and is of little importance to the invention, so the much simpler graphical representation of FIG. 2b is preferable when only the existence or non-existence of SACCH allocations in a multiframe is considered. In FIG. 2b the eight consecutive multiframes 2201 to 2208 are shown so that only two square fields represent each multiframe. These fields refer to those burst periods within a multiframe which can be allocated to SACCH, i.e. the allocated burst periods in the 13th and 26th frames of that multiframe. If we consider the continuous frame numbering scheme from 0 to 207 in the sequence of eight consecutive multiframes, the sixteen square fields illustrated in FIG. 2b correspond to the allocated burst periods in the frames number 12, 25, 38, 51, 64, 77, 90, 103, 116, 129, 142, 155, 168, 181, 194 and 207. A letter S in the field indicates that the multiframe comprises, in the corresponding burst period, an allocation for the SACCH of a quarter-rate traffic channel. A letter I in the field indicates that the corresponding burst period is idle with respect to the quarter-rate traffic channel considered. The burst period allocations represented by FIGS. 2a and 2b are the same.

Figure 3A:
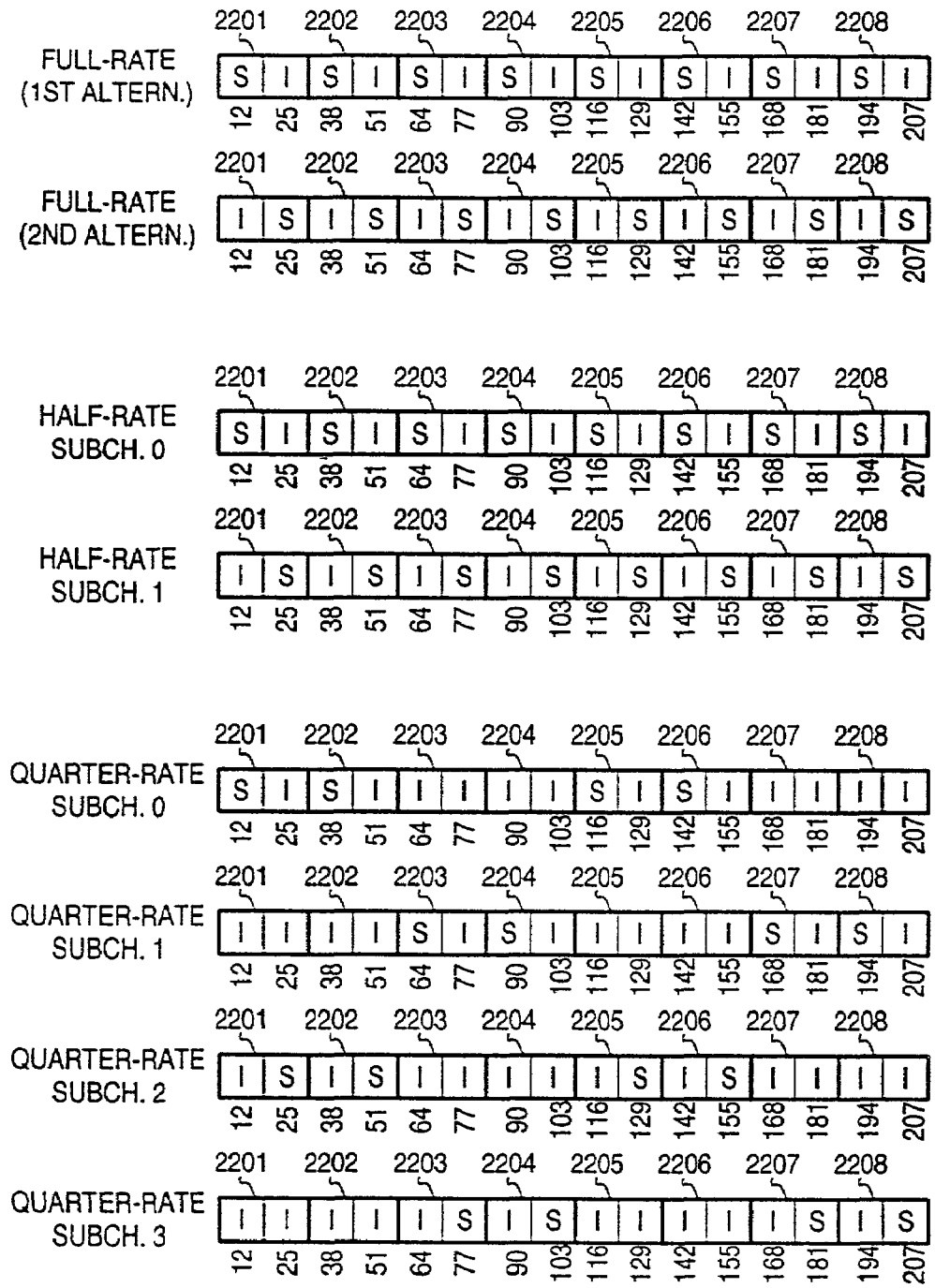
FIG. 3b illustrates an advantageous way for the mutual timing of uplink and downlink SACCH allocations.

FIG. 3a illustrates a comparison of the SACCH allocations of a full-rate traffic channel, two half-rate traffic channels and four quarter-rate traffic channels. The full-rate traffic channel is associated with an SACCH the burst period allocations of which are either in frames 12, 38, 64, 90, 116, 142, 168 and 194 or in frames 25, 51, 77, 103, 129, 155, 181 and 207 of the frames 0 to 207 included in the sequence of eight consecutive multiframes. The half-rate traffic channels are associated with corresponding SACCHs so that the SACCH burst period allocations of half-rate subchannel 0 are in frames 12, 38, 64, 90, 116, 142, 168 and 194 and the SACCH burst period allocations of half-rate subchannel 1 are in frames 25, 51, 77, 103, 129, 155, 181 and 207. The quarter-rate traffic channels are associated with corresponding SACCHs so that the SACCH burst period allocations of quarter-rate subchannel 0 are in frames 12, 38, 116, and 142; the SACCH burst period allocations of quarter-rate subchannel 1 are in frames 64, 90, 168 and 194; the SACCH burst period allocations of quarter-rate subchannel 2 are in frames 25, 51, 129 and 155; and the SACCH burst period allocations of quarter-rate subchannel 3 are in frames 77, 103, 181 and 207.

A comparison between the SACCH burst period allocations of the half-rate subchannels and the quarter-rate subchannels in FIG. 3a shows that the transmission capacity which a full-rate traffic channel would take as a whole can be given not only to two complemetary half-rate channels or four complementary quarter-rate channels but also to a combination of one half-rate channel and two quarter-rate channels. Taken that the SACCH burst period allocations adhere to the patterns given in FIG. 3a, possible combinatory allocations are half-rate subchannel 0 simultaneously with quarter-rate subchannels 2 and 3, or half-rate subchannel 1 simultaneously with quarter-rate subchannels 0 and 1.

According to the invention, when a quarter-rate traffic channel is used it suffices to encode the SACCH information relatively lightly: the channel coding procedure need not produce more than two SACCH bursts from an SACCH block. In FIG. 3a this means that for example on the quarter-rate subchannel 0, the SACCH bursts transmitted in frames 12 and 38 may convey the information contents of a complete SACCH block, so in the best case the SACCH bursts transmitted in frames 116 and 142 may already refer to the information contents of the next complete SACCH block. However, it may happen that the channel coding was indeed insufficient to protect the first two SACCH bursts produced from an SACCH block against transmission errors. In such a case the device receiving the corrupted SACCH bursts is not able to decode the SACCH block correctly. In that case the invention is meant to be applied so that before the occurrence of the next allocated SACCH burst periods in the same transmission direction, the device which received the corrupted SACCH blocks asks the device which transmitted the SACCH blocks for retransmission, and instead of using the next allocated SACCH burst periods for the transmission of completely new SACCH information the transmitting device retransmits the SACCH information which was the subject of the corrupted SACCH blocks in one form or another.

The invention does not limit the selection of the method which is used to implement an SACCH retransmission request. However, one advantageous method is such where, after a certain device has received two SACCH bursts and decided that a retransmission is needed, it has its allocated SACCH burst transmission turns in the reverse direction conveniently before the time when the retransmission should take place. As an example we may assume that a terminal device is using a quarter-rate subchannel 0 as described in FIG. 3a and has received corrupted downlink SACCH bursts in the allocated burst periods of downlink frames 12 and 38. It should now ask for a retransmission to be performed in the allocated burst periods of downlink frames 116 and 142. If the uplink SACCH allocations follow the pattern given for the (downlink) subchannel 1, the terminal device transmits uplink SACCH bursts in the allocated burst periods of uplink frames 64 and 90. It may use these uplink SACCH bursts to indicate the need for a retransmission. Taken that the SACCH bursts have the well known structure consisting of three tail symbols, 57 information symbols, one flag symbol, 26 training sequence symbols, one flag symbol, 57 information symbols and three tail symbols, the terminal device may use for example at least one of the flag symbols in the uplink SACCH bursts to indicate the need for a retransmission. It may be specified that for example mapping a certain but sequence into the corresponding symbols values of the flag symbols of SACCH bursts in certain direction means that a SACCH retransmission is needed in the other direction.

Figure 3B:
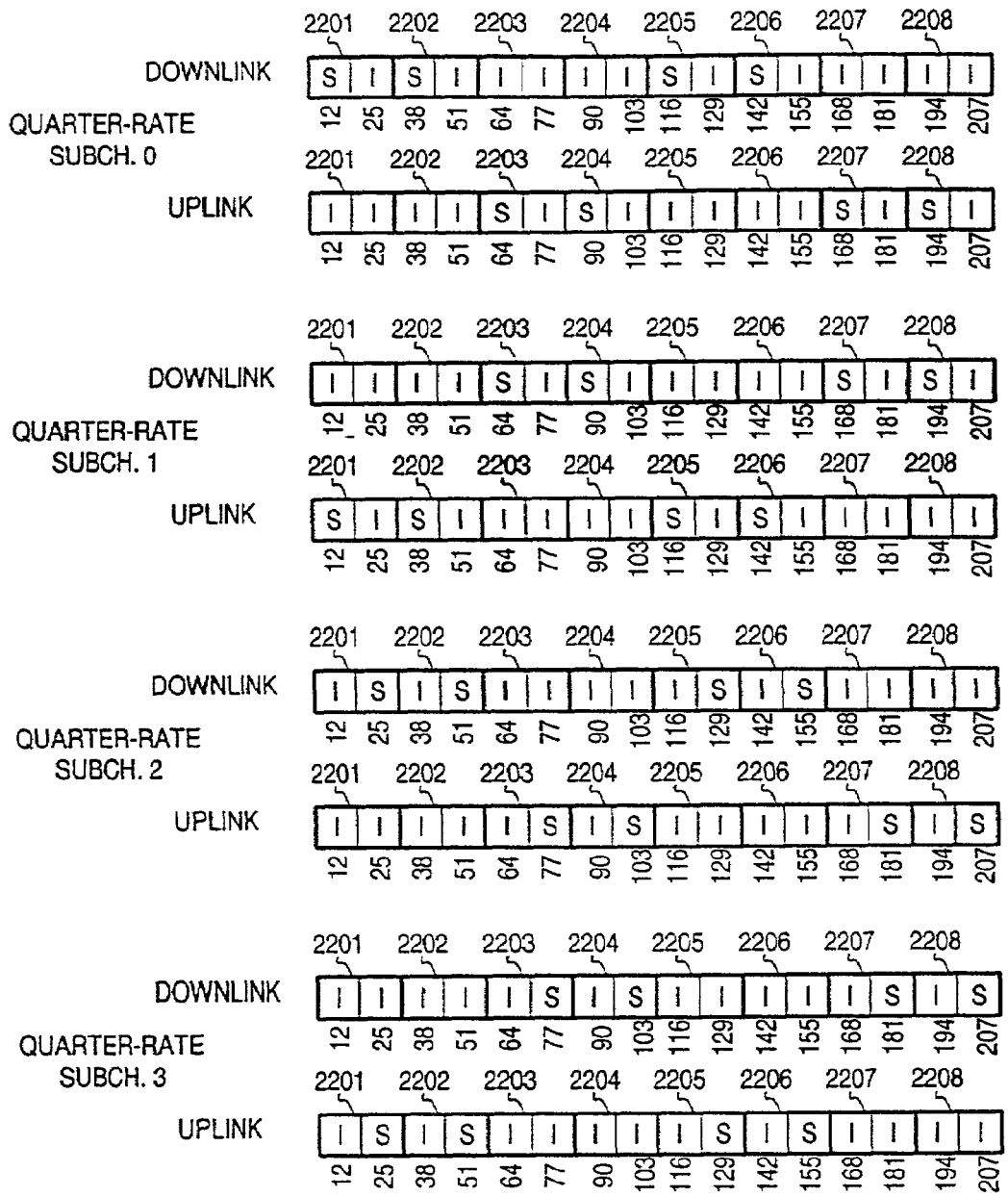

FIG. 3b shows the advantageous timing relations described above between downlink and uplink SACCH allocations for all subchannels 0, 1, 2 and 3. A natural alternative to the arrangement shown in FIG. 3b is to exchange the words "uplink" and "downlink" regarding at least one subchannel.

It is possible to retransmit the SACCH bursts which were found to be corrupted exactly in the same form for the second time. However, it is also possible to apply a slightly different channel encoding scheme, most advantageously changing the so-called generator polynomial in the channel encoding process, so that the receiver has, once it has received also the later version, actually more information at its disposal to help in the decoding process than it would have if it had only received an exact copy of the same SACCH bursts twice.

Figure 4:
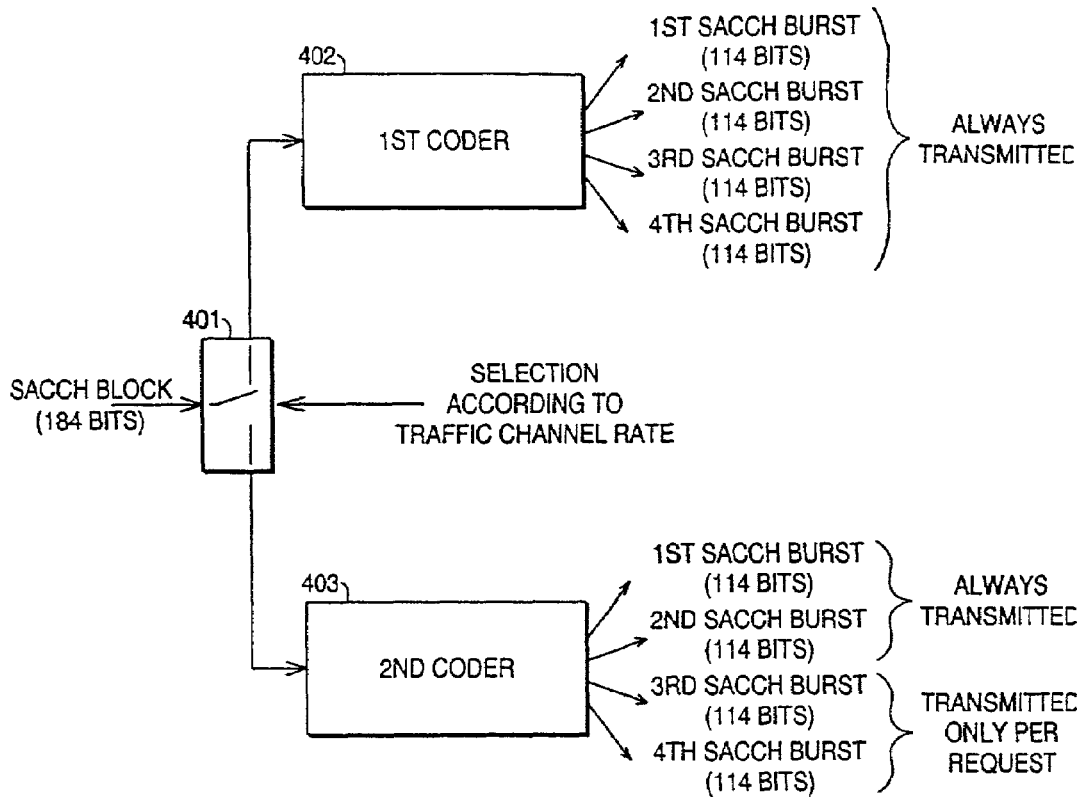
FIG. 4 is a schematic representation of an encoder and transmitter device.

FIG. 4 is a schematic representation of a transmitting device which implements the present invention. The SACCH blocks to be transmitted come into a switch 401 the state of which is selected on the basis of whether or not a quarter-rate traffic channel is in use. In the conventional case the SACCH block is just directed into a known channel encoder 402 which produces four SACCH bursts as was described in the description of prior art. All these SACCH bursts are transmitted according to a certain SACCH transmission timetable.

If a quarter-rate traffic channel is used, the switch 401 is set into its lower state which causes the SACCH blocks to be conveyed into another channel encoder 403 which is arranged to produce at least two SACCH bursts. The first and second SACCH bursts produced by the second channel encoder 403 alone suffice for a decoder to decode the contents of an SACCH block which was subjected to channel encoding, if they are not corrupted more than up to a certain threshold value. The third and fourth SACCH bursts produced by the second channel encoder 403 can be, as was stated earlier, the same as the first and second SACCH bursts, or they can be slightly different for example so that a different generator polynomial was used in the decoder 403 to produce them.

Figure 5:
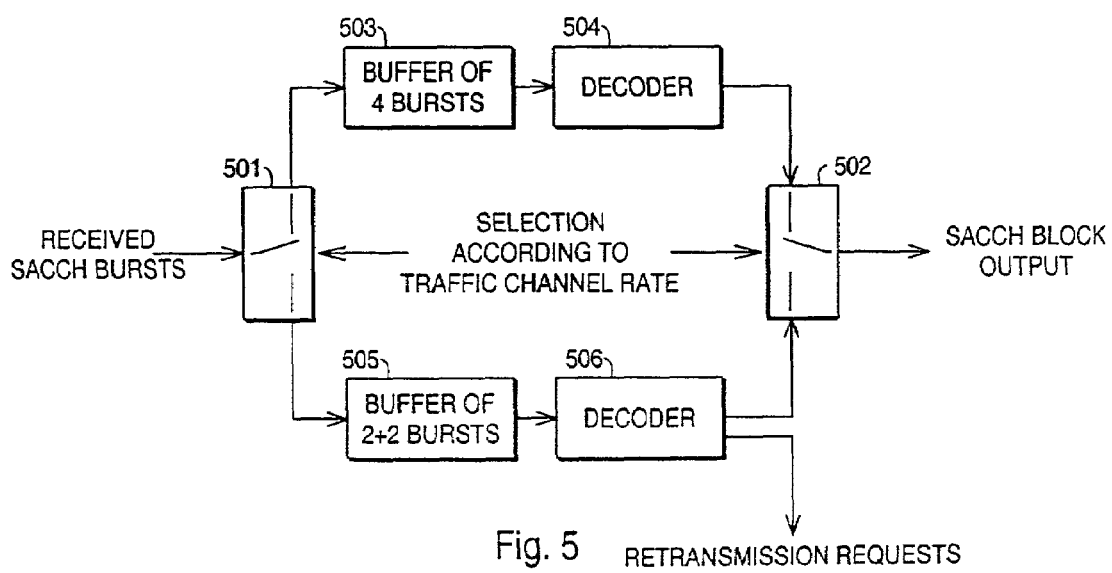
FIG. 5 is a schematic representation of a receiver and decoder device.

FIG. 5 is a schematic representation of a receiving device which receives the SACCH bursts produced by the transmitter device illustrated in FIG. 4. There is an arrangement of two selection switches 501 and 502 which are both set to their lower state or both set to their upper state (referring to the graphical representation of FIG. 5) according to whether or not a quarter-rate traffic channel is used respectively. Normal SACCH decoding in association with some other than a quarter-rate traffic channel proceeds by buffering four consecutive SACCH bursts in a buffer 503 before taking them all together to a decoder 504 the output of which is a complete SACCH block. If a quarter-rate traffic channel is used, the SACCH bursts are conveyed into another buffer 505 from which already the first two bursts are take to a decoder 506. If decoding is found to be successful, the resulting SACCH block is output through the output selection switch 502. If, however, decoding failed with only the two first SACCH bursts as input information, the decoder 506 generates a retransmission request which causes another pair of SACCH bursts to be received before attempting the decoding anew.

Figure 6:
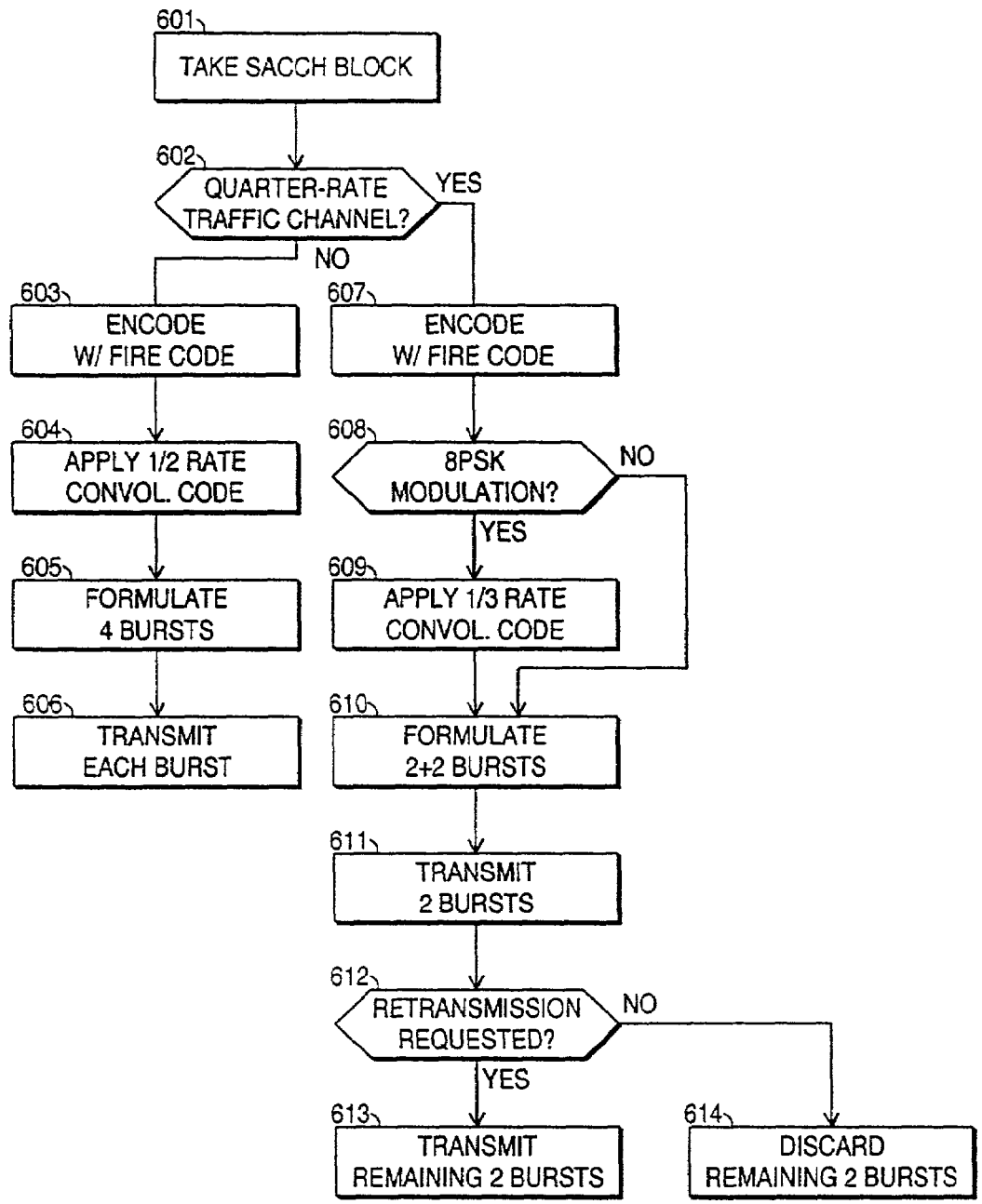
FIG. 6 illustrates a method according to an embodiment of the invention and FIG. 7 illustrates a method according to another method of the invention.

FIG. 6 illustrates the operation of a transmitting device according to the invention as a flow diagram. At step 601 an SACCH block is taken, and at step 602 it is checked, whether or not a quarter-rate traffic channel is in use. If not, the encoding proceeds in a manner known as such through Fire encoding at step 603 and convolutional encoding at step 604 into the formulation of four separate SACCH bursts at step 605. Each of these bursts is transmitted at its turn at step 606. A positive finding at step 607 leads to another Fire encoding step 607 where the applied Fire code is associated with a generator polynomial which is selected so that two "independent" burst pairs may be produced, where "independent" means that at least one of the pairs is such which alone gives enough information for decoding the SACCH block.

Steps 608 and 609 only come into consideration if it is possible to select 8PSK (eight-level phase shift keying) as the modulation method in transmitting the SACCH bursts. The basic modulation method is thought to be GMSK or Gaussian Minimum Shifk Keying where each transmission symbol only carries one information bit. With GMSK the Fire encoded SACCH information is taken as such to the step 610 of formulating at least two SACCH bursts. Higher-order modulation methods such as 8PSK allow more bits to be transmitted within a single transmission symbol; for example each 8PSK symbol is equivalent to three bits. Therefore the use of 8PSK may be combined to ⅓ rate convolutional encoding at step 609.

The convolutional code applied at step 609 may be selected from a number of possible codes as is known as such from prior art. Especially the selection of code may be different for the first pair of SACCH bursts than for the possible retransmission pair of SACCH bursts. Selecting a code is synonymous to selecting a generator polynomial set. Changing the code (i.e. the polynomial set) for retransmission increases the chances of the receiver to correctly decode the SACCH block. In order to avoid allocating a field from each SACCH burst for indicating which code (i.e. which polynomial set) was applied in its coding, we may associate the codes (i.e. the polynomial sets) with frame numbers in the sequence of eight consecutive multiframes. As an example, a first polynomial set may be used for coding all SACCH bursts to be transmitted in frames 12, 25, 38, 51, 64, 77, 90 and 103, and a second polynomial set may be used for coding all SACCH bursts to be transmitted in frames 116, 129, 142, 155, 168, 181, 194 and 207. Also other associative mappings between polynomial sets and frame numbers are possible.

The burst formulation at step 610 was already desciber earlier. At step 611 the first two SACCH bursts are transmitted. At step 612 the transmitting device checks, whether the receiving device asked for retransmission. In a positive case the transmitting device transmits also the remaining two bursts at step 613. If retransmission is not requested, the transmitting device discards the remaining bursts at step 614.

Figure 7:
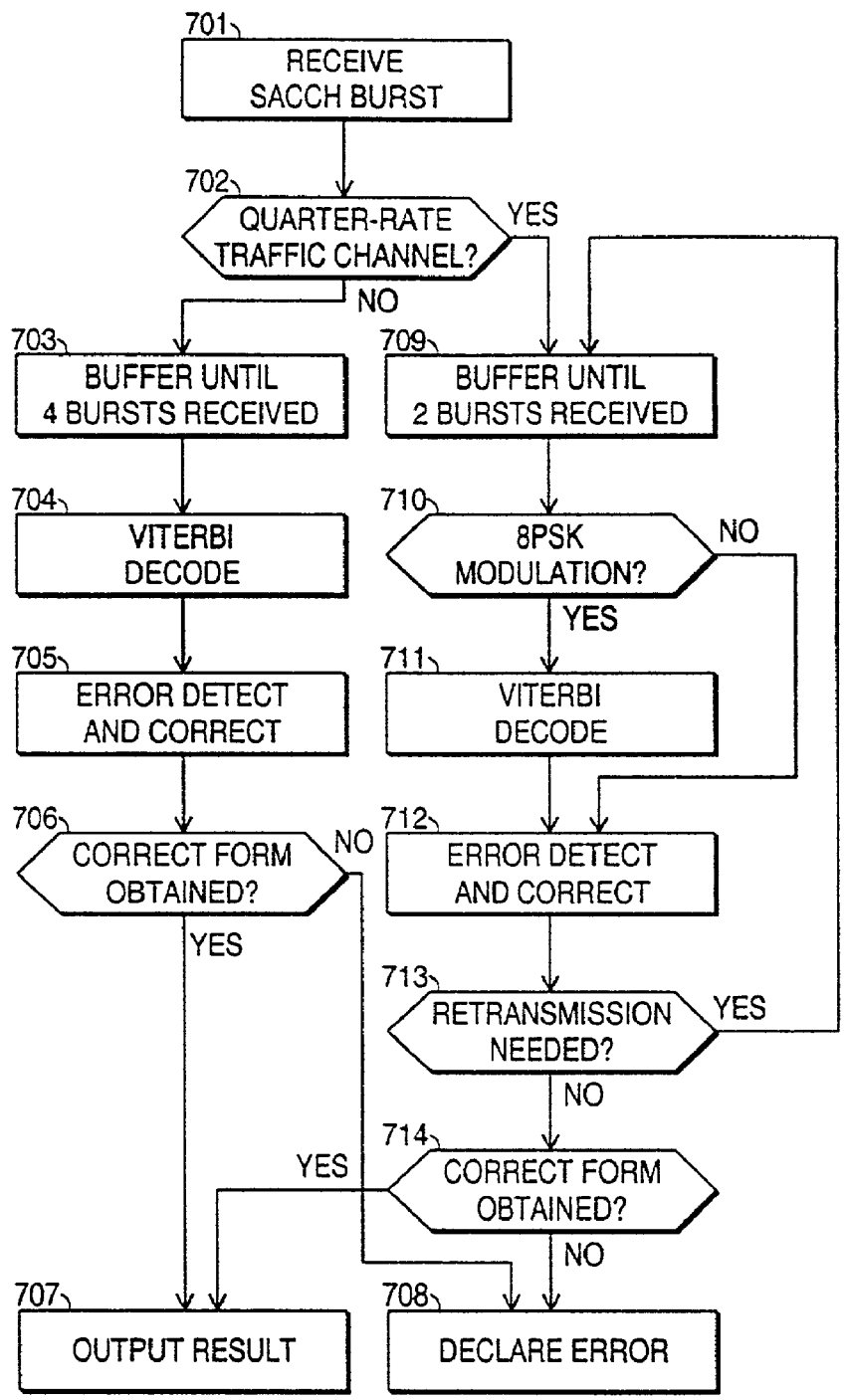

FIG. 7 is a corresponding flow diagram that illustrates the operation of a receiving device. At step 701 it receives an SACCH burst and at step 702 it checks, whether a quarter-rate traffic channel is used. A negative finding leads to buffering four consecutive SACCH bursts at step 703 before removing the convolutional code by Viterbi decoding at step 704. At step 705 the receiver decodes the Fire code and uses its properties to detect and possibly correct errors. At step 706 it checks, whether it managed to successfully decode the SACCH block. In a positive case it outputs the received and decoded SACCH block at step 707, and in a negative case it declares the SACCH block as erroneous at step 708.

If a quarter-rate traffic channel was found to be in use at step 702, only two bursts are buffered at step 709. Again, if 8PSK modulation was used there is the additional step of finding the need of and implementing a step of Viterbi decoding at steps 710 and 711. The polynomial set used in decoding may be selected according to the location of the received bursts in the structure of eight consecutive multiframes. In any case the Fire code is decoded at step 712 to detect and possibly correct any errors that occurred during transmission. Step 713 is a check of whether the decoding at step 712 succeeded. If not, the receiving device returns to step 709 and repeats steps 709, 710, 711 and 712 with the difference that the latter two SACCH are now handled at steps 709, 710 and 711 and all received SACCH bursts referring to the same SACCH block are considered as input information to the decoding at step 712. If retransmission is not needed at step 713, either because already the first two SACCH bursts gave a correctly decoded result or because a retransmission was already asked for, there remains a check at step 714 whether a correctly decoded result was arrived at. The consequent steps from step 714 are the same as from step 706.

The use of system-specific terms such as SACCH should not be construed to limit the applicability of the invention in different cellular radio systems. The features recited in the depending claims are freely combinable unless explicitly otherwise stated.

What is claimed is:

1. A method for transmitting control information on a control channel associated with a traffic channel, comprising the steps of:
   a) determining the traffic channel to be either a full- or half rate channel or a quarter rate channel;
   b1) as a response to determining the traffic channel to be a full- or half rate channel at step a), transforming a control information block of fixed size in the control channel into a first number of control information bursts and transmitting all these control information bursts, or alternatively
   b2) as a response to determining the traffic channel to be a quarter rate channel at step a);
   transforming a control information block of said fixed size into a second number of control information bursts, where said second number is smaller than the first number;
   transmitting said second number of control information bursts;
   checking whether a retransmission is requested concerning said second number of transmitted control information bursts; and
   if a retransmission is requested concerning said second transmitted control information bursts, transmitting another number of control information bursts describing the contents of the control information block which was transformed into said second number of transmitted control information bursts.

2. A method according to claim 1, wherein step b1) comprises the step of transforming a control information block of fixed size into four control information bursts and step b2) comprises the step of transforming a control information block of said fixed size into two control information bursts.

3. A method according to claim 2, wherein step b2) comprises the step of
   if a retransmission is requested concerning said second transmitted control information bursts, transmitting another two control information bursts describing the contents of the control information block which was transformed into said two transmitted control information bursts.

4. A method for receiving control information on a control channel associated with a traffic channel, comprising the steps of:
   a) determining the traffic channel to be either a full- or half rate channel or a quarter rate channel; and
   b1) as a response to determining the traffic channel to be a full- or half rate channel at step a), buffering a first number of received control information bursts and transforming them into a control information block of fixed size in the control channel, or alternatively
   b2) as a response to determining the traffic channel to be a quarter rate channel at step a),
   buffering a second number of received control information bursts, where said second number is smaller than the first number,
   attempting the transformation of said second number of control information bursts into a control information block of fixed size,
   checking, whether the attempted transformation of said second number of control information bursts into a control information block of fixed size was successful, and
   if the attempted transformation of said second number of control information bursts into a control information block of fixed size was not successful, requesting for a retransmission concerning said second number of transmitted control information bursts and attempting the transformation of said second number of control information bursts together with a retransmission concerning them into a control information block of fixed size.

5. A method according to claim 4, wherein step b1) comprises the step of buffering four received control information bursts and step b2) comprises the steps of buffering two received control information bursts and attempting the transformation of said two received control information bursts into a control information block of fixed size.

6. A method according to claim 5, wherein step b2) comprises the step of
   if the attempted transformation of said two received control information bursts into a control information block of fixed size was not successful, requesting for a retransmission of another two control information bursts and attempting the transformation of all received four control information bursts into a control information block of fixed size.

* * * * *